Feb. 4, 1936. L. D. MARTIN 2,029,930
CAM FOLLOWER FOR A STRIP ADVANCING MECHANISM
Filed Nov. 30, 1934

Inventors
Louis D. Martin,
Newton M. Perkins,
George A. Gillette Jr.
By
Attorneys Patented Feb. 4, 1936

2,029,930

UNITED STATES PATENT OFFICE 2,029,930

CAM FOLLOWER FOR A STRIP ADVANCING MECHANISM

Louis D. Martin, Rochester, N. Y., assignor to Eastman Kodak Company, Rochester, N. Y., a corporation of New York Application November 30, 1934, Serial No. 755,459

3 Claims. (Cl. 74—54)

The present invention relates to an improvement in the construction of a cam follower, and more particularly to the construction of a follower for a cam composed of a non-metallic moisture expansible material.

Within recent years, many non-metallic materials have been created as substitutes for metal because of certain desirable properties. However, certain of these materials are subject to change in dimensions with variations in atmospheric conditions, and in this respect are inferior to metal. The rapid changes in the direction and acceleration of movements in a strip material advancing mechanism cause considerable noise when all the cams and gears are made of metal. In many types of strip handling machines, such as motion picture apparatus, the reduction of noise is a prime consideration, and these non-metallic materials are almost ideal for certain of the cams and gears, except that many of the resinous, rubber, and/or phenolic materials undergo considerable change under various atmospheric conditions. For instance, a base of laminated fabric impregnated with a phenol condensation resin under pressure is rapidly expanded by the absorption of moisture from the atmosphere.

The primary object of the present invention is the provision in an advancing mechanism for a perforated strip of a cam follower which carries a flexible portion for engaging the cam and capable of being flexed by expansion of the cam.

Another object of the invention is the provision in an advancing mechanism of a cam follower which has a flexible portion with at least one end rigidly connected to the cam follower and which has a hardened surface for engaging the cam, the hardening of said engaging surface causing increase in the resiliency of the flexible portion.

A further object of the invention is the provision in an advancing mechanism of a cam of moisture expansible material and a cam follower composed of metal and having juxtaposed engaging surfaces for continuous contact with opposite portions of the cam, one of said engaging surfaces being carried by a flexible portion of the cam follower.

Other and further objects of the invention will be suggested to those skilled in the art by the following dislosure of my invention.

The aforementioned objects are obtained in an advancing mechanism of a conventional type including a cam composed of a laminated phenolic or other moisture expansible material and including a cam follower which has a flexible portion for engaging the cam under ordinary conditions of operation and capable of being flexed upon expansion of the material for the cam by moisture in the atmosphere.

Reference is hereby made to the accompanying drawing in which similar reference characters designate similar elements, and in which.

The invention is now to be described with respect to a claw-type film advancing mechanism, however, it is to be understood that the principle of the invention may be employed in any type of cam follower which is being subjected to excessive wear or friction by the expansion of the material composing the cam under moist atmospheric conditions.

Figure 1:
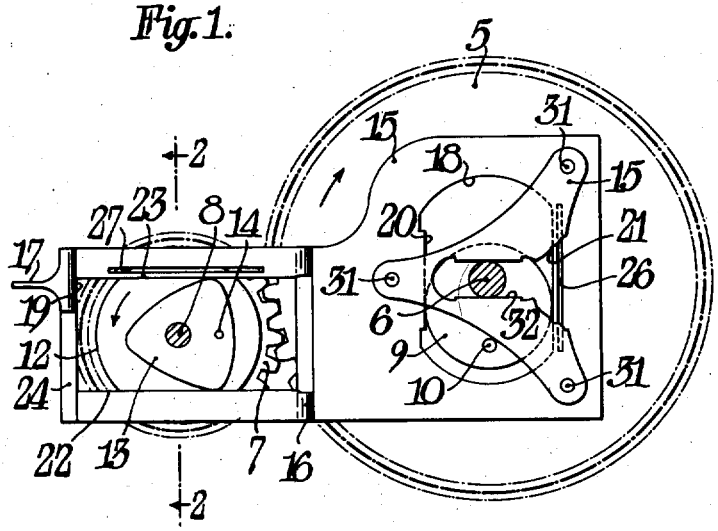
Fig. 1 is a side elevation of a claw-type of advancing mechanism constructed according to the principles of the present invention.

By way of example only, the film advancing mechanism providing the background or setting for the invention is very similar to that now employed in the majority of amateur motion picture projectors. This advancing mechanism includes a large pinion gear 5 mounted for rotation on a shaft 6 in the direction of the arrow shown in Fig. 1. A small pinion gear 7 is mounted for rotation about a counter-shaft 8 and meshes with the large pinion gear 5 to be driven in the direction of the arrow in Fig. 1. As is customary in this "skip stroke" type of advancing mechanism, the ratio between pinion gears 5 and 7 is 2:1.

An eccentric cam 9 is mounted on one face of pinion gear 5 eccentrically to the shaft 6 by means of a pin 10. The counter-shaft 8 carries a bushing 11, see Fig. 2, which includes a disk 12. A triangular cam 13, generally called a Lumière cam, is attached to the disk 12 by a stud 14.

The cam follower 15 has a step 16 and carries a claw 17 for engaging the film perforations and for advancing the film. The cam follower 15 is provided with an opening 18 for reception of the eccentric cam 9 and is provided with an opening 19 for the reception of the triangular cam 13. The cam engaging surfaces are located along the edges of openings 18 and 19 and are generally located in parallel and opposed relation with respect to each other.

Figure 2:
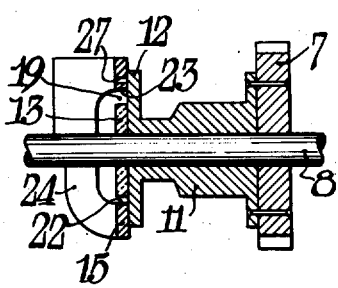
Fig. 2 is a cross-section of the advancing mechanism taken on the line 2—2 of Fig. 1.

A cam engaging surface 20 extends along one side of the opening 18, while a second cam engaging surface 21 extends along the other side of opening 18. Cam engaging surfaces 20 and 21 are both in continuous contact with opposite portions of the eccentric cam 9. Another cam engaging surface 22 extends along one side of the opening 19, while still another cam engaging surface 23 extends along the opposite side of opening 19 and is parallel to cam engaging surface 22. A yoke 24 forms the front portion of cam follower 15, as best seen in Fig. 2. A spider 25 is attached to the cam follower 15 by a plurality of rivets 31 and is provided with a slot 32. The slot 32 has parallel opposite edges for engaging the periphery of spindle 6 and for preventing vertical movement of the rear of cam follower 15. In other words the slot 32 cooperates with shaft 6 to permit eccentric cam 9 only to reciprocate the cam follower 15 in a longitudinal direction and to permit the triangular cam 13 only to rotate the cam follower 15 about the axis of shaft 6.

The advancing mechanism thus far described is of well-known design and moves the claw 17 in a figure 8 path. This advancing mechanism, when all the parts are composed of metal, is quite noisy and therefore objectionable for use on motion picture machines. Much of this noise can be eliminated by making the eccentric cam and the triangular cam 13 of a non-metallic material, and, incidentally, the pinion gear 5 may also be made of such a material.

The non-metallic materials which are practical and available for the composition of these cams are phenol condensation products of resins, rubber, fiber, etc. One of the best materials for the manufacture of said cams is made by impregnating under pressure a plurality of layers of linen or other fabric with a phenol condensation product. Of course, the layers or laminations may be of a material other than fabric, for instance, paper, but linen, with the alternate layers placed with the warp threads in angular relation, has been found to be best suited for the purpose. This expedient is, of course, well known to manufacturers of this type of composition. Some of the commercial products on the market which have been found to be quite satisfactory under actual test are known as "Spaldite" and "Formica". Any or all of these materials are known to change appreciably in size, because they absorb moisture from the atmosphere. Consequently, where the context permits these materials will be generally described as non-metallic moisture expansible material.

Obviously, there can be no play or lost motion between either of the cams 9 and 13, and the cam engaging surfaces 20 and 21, and 22 and 23, respectively. However, if these cams 9 and 13 are composed of moisture expansible material of the type just described, then any expansion of the material or cam will cause excessive pressure on the opposite cam engaging surfaces and will result in excessive friction between the cams and cam engaging surfaces.

The problem to be solved by the present invention has now been completely presented. According to the invention, a portion of the cam follower which carries or bears one of the cam engaging surfaces has been made flexible so that said cam engaging surface will always snugly fit against the cam and so that said portion may be flexed upon expansion of the cam by the absorption of moisture by the material of which the cam is made. This flexible portion of the cam follower may be provided either as shown in connection with Figs. 1 and 2, as shown in Fig. 3, or by any other equivalent construction.

For the purpose just indicated, the cam follower 15 is provided with an opening adjacent one of the cam engaging surfaces, such as an elongated slit 26 which is parallel to and adjacent to the cam engaging surface 21. The portion of the cam follower 15 between surface 21 and slit 26 is thus made flexible so that if the eccentric cam 9 should expand in a diametral direction, then this intervening flexible portion may bend. In a similar manner, an elongated slit 27 is located in parallel spaced relation to the cam engaging surface 23 to render the thin portion between said surface and said slit capable of flexing with diametral expansion of the triangular cam 13 when composed of moisture expansible material.

The cam engaging surfaces 21, 22, 23, and 24 are subject to terrific wear in this type of advancing mechanism. In order to increase the wear-resisting property of these surfaces, the cam follower may be selectively hardened at these surfaces. Such selective hardening is already a known procedure to those skilled in the manufacture of cam followers. Under the present circumstances, this hardening of the cam engaging surface presents an additional advantage, in that the flexible portions between surface 21 and slit 26 and between surface 23 and slit 27 are rendered more resilient to increase the life of the metal in said flexible portions.

Figure 3:
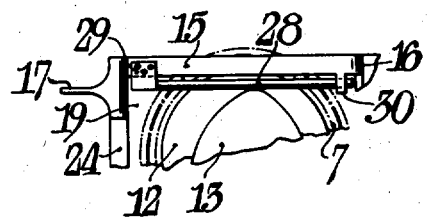
Fig. 3 is a fragmentary side elevation of a modified form of a cam follower embodying my invention.

As an alternative embodiment of the invention, one cam engaging surface may be composed, see Fig. 3, of a steel wire 28, which is rigidly connected at one end to the cam follower 15 by a bracket 29 and which is slidably connected to the cam follower 15 at the other end by an eyelet 30. As before, the surface of wire 28 is located to bear upon the edge of cam 13, and upon diametral expansion of the material composing cam 13, the wire 28 will be flexed but will still remain in engagement with the edge of the cam.

The provision of this flexible portion of the cam follower is also advantageous for the purpose of absorbing shocks which are always present in such an advancing mechanism because of the rapid change in accelerations and directions of movement. This shock absorbing function, although important, is considered to be secondary to the capability of the flexible portions to be flexed by expansion of the material composing the cams.

The flexible portion for the cam follower, according to the present invention, may be provided in a multitude of ways. However, any construction coming within the scope of the appended claims is deemed to be within the spirit of my invention. The instant disclosure is merely by way of illustration.

Having now particularly described my invention, what I claim as new and desire to secure by Letters Patent of the United States is:

1. In a device of the character described, the combination with a movable cam composed of a non-metallic composition which is susceptible to change in size with change in atmospheric conditions, of a cam follower having a pair of juxtaposed surfaces for engaging opposite surfaces of said cam, and including a resilient portion carrying one of said surfaces and for insuring continuous engagement between said cam surfaces and said follower surfaces, said resilient portion also being flexible for movement with respect to said follower without altering the condition of continuous engagement between said cam and follower and being flexed upon change in the size of said cam, which change in size results from change in atmospheric conditions.

2. In a device of the character described, the combination with a movable cam composed of a non-metallic composition which is susceptible to change in size with change in atmospheric conditions, of a cam follower having a pair of juxtaposed surfaces for engaging opposite surfaces of said cam, and including a resilient portion carrying one of said surfaces and for insuring continuous engagement between said cam surfaces and said follower surfaces, said cam follower being slotted adjacent one of said juxtaposed surfaces to form an integral resilient portion for insuring continuous engagement between said cam surfaces and said follower surfaces, said resilient portion also being flexible for movement with respect to said follower without altering the condition of continuous engagement between said cam and follower and being flexed upon change in the size of said cam, which change in size results from change in atmospheric conditions.

3. In a device of the character described, the combination with a movable cam composed of a non-metallic composition which is susceptible to change in size with change in atmospheric conditions, of a cam follower having a pair of juxtaposed surfaces for engaging opposite surfaces of said cam, and including a resilient portion which is fixed at one end to said cam follower, which is slidably connected at the other end to said cam follower, and which carries one of said juxtaposed surfaces for insuring continuous engagement between said cam surfaces and said follower surfaces, said resilient portion also being flexible for movement with respect to said follower without altering the condition of continuous engagement between said cam and follower and being flexed upon change in the size of said cam, which change in size results from change in atmospheric conditions.

LOUIS D. MARTIN.